US009336372B2

(12) United States Patent
He

(10) Patent No.: US 9,336,372 B2
(45) Date of Patent: May 10, 2016

(54) LOST ACCOUNT INFORMATION RECOVERY METHOD AND ASSOCIATED APPARATUS AND SYSTEM

(71) Applicant: Tencent Technology (Shenzhen) Company Limited, Shenzhen (CN)

(72) Inventor: Chang He, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 44 days.

(21) Appl. No.: 14/460,241

(22) Filed: Aug. 14, 2014

(65) Prior Publication Data

US 2015/0121544 A1   Apr. 30, 2015

Related U.S. Application Data

(63) Continuation of application No. PCT/CN2014/079584, filed on Jun. 10, 2014.

(30) Foreign Application Priority Data

Oct. 28, 2013  (CN) .......................... 2013 1 0516325

(51) Int. Cl.
*G06F 21/31* (2013.01)
*H04L 29/06* (2006.01)
(52) U.S. Cl.
CPC .............. *G06F 21/31* (2013.01); *H04L 63/107* (2013.01); *G06F 2221/2111* (2013.01)
(58) Field of Classification Search
None
See application file for complete search history.

(56) References Cited

U.S. PATENT DOCUMENTS 5,922,073 A * 7/1999 Shimada ............. G06F 21/6218 726/6
8,793,776 B1 * 7/2014 Jackson ................ H04W 4/023 726/7

(Continued)

FOREIGN PATENT DOCUMENTS

| CN | 101496427 A | 7/2009 |
| CN | 103338443 A | 10/2013 |
| WO | WO 2012040231 A2 | 3/2012 |

OTHER PUBLICATIONS

Tencent Technology, ISR, PCT/CN2014/079584, Jul. 30, 2014, 2 pgs.

*Primary Examiner* — Lisa Lewis
*Assistant Examiner* — Henry Tsang
(74) *Attorney, Agent, or Firm* — Morgan, Lewis & Bockius LLP

(57) ABSTRACT

A method, apparatus and system for securely managing account information are disclosed. In some embodiments, the method is performed at a computer system having one or more processors and memory for storing programs to be executed by the one or more processors. The method includes receiving a request associated with an account. The request includes location verification information. The method includes retrieving, in response to the request, information of a set of predefined locations associated with the account. The method also includes comparing information of the set of predefined locations with the received location verification information to determine whether the received location verification information satisfies a predefined condition. The method further includes sending a response to the request to a destination associated with the account when the received location verification information satisfies the predefined condition. The response includes confidential information associated with the account.

18 Claims, 7 Drawing Sheets

(56) References Cited

U.S. PATENT DOCUMENTS

| | | | | |
|---|---|---|---|---|
| 8,904,496 B1* | 12/2014 | Bailey | ............... | G06F 21/44 709/224 |
| 2002/0125886 A1* | 9/2002 | Bates | ............... | G06F 21/6218 324/307 |
| 2009/0254975 A1* | 10/2009 | Turnbull | ............... | H04L 63/0492 726/3 |
| 2011/0191838 A1* | 8/2011 | Yanagihara | ............... | G06F 15/16 726/7 |
| 2014/0143845 A1* | 5/2014 | Roy | ............... | G06F 21/60 726/6 |
| 2014/0164761 A1* | 6/2014 | Kufluk | ............... | H04L 63/10 713/155 |

\* cited by examiner

LOST ACCOUNT INFORMATION RECOVERY METHOD AND ASSOCIATED APPARATUS AND SYSTEM

RELATED APPLICATION

This application is a continuation application of PCT Patent Application No. PCT/CN2014/079584, entitled "ACCOUNT MANAGEMENT METHOD AND ASSOCIATED APPARATUS AND SYSTEM" filed on Jun. 10, 2014, which claims priority to Chinese Patent Application No. 201310516325.0, entitled "ACCOUNT PASSWORD MANAGEMENT METHOD AND ASSOCIATED APPARATUS AND SYSTEM", filed Oct. 28, 2013, both of which are incorporated herein by reference in their entirety.

TECHNICAL FIELD

The present application generally relates to the field of information management technologies, and more particularly to an account management method and a related apparatus and system.

BACKGROUND

With the development of computer technologies, Internet technologies and communications technologies, nowadays people can communicate with each other anywhere, anytime by using various instant messaging applications, social applications, mail applications and communications applications. Moreover, people can conduct a variety of operations such as online transaction and use of network hard disk drives by using various other applications. Therefore, a user terminal can be provided with a large number of applications, and a user typically needs to memorize a large quantity of account information required for user authentication associated with a user account, such as user names, passwords, and other account-related information.

As a result, a user may forget some account information such as a password associated with a user account. In such a scenario, usually the user is prompted to go through a known password-retrieving method, which typically includes: the user sending a request to retrieve the password by providing a user name, a server automatically sending the password to an email account or a mobile phone associated with the user name, and the user retrieving the password from the email account or mobile phone.

Such a process for retrieving lost passwords, however, is insecure because email accounts and mobile phones are typically vulnerable to hacking. Thus, a need exists for a method, apparatus and system that can securely manage user accounts and retrieve lost account information.

SUMMARY

The above deficiencies associated with the known password-retrieving method may be reduced or eliminated by the techniques described herein.

In some embodiments, a method for securely managing account information is performed at a computer system having one or more processors and memory for storing programs to be executed by the one or more processors. The method includes receiving a request associated with an account. The request includes location verification information. In some instances, the received location verification information includes information of more than one verifying location. In some instances, the received location verification information includes at least one of location information defined by a user of a mobile device or location information generated by a Global Positioning System (GPS) of a mobile device. The method includes retrieving, in response to the request, information of a set of predefined locations associated with the account. In some instances, the set of predefined locations includes more than one predefined location associated with the account.

The method also includes comparing information of the set of predefined locations with the received location verification information to determine whether the received location verification information satisfies a predefined condition. In some instances, the predefined condition is defined such that the received location verification information satisfies the predefined condition when at least one distance between a verifying location from the set of verifying locations and a predefined location from the set of predefined locations is less than a predetermined distance. In some other instances, the predefined condition is defined such that the received location verification information satisfies the predefined condition when each verifying location from the set of verifying locations is within a predetermined distance from at least one predefined location from the set of predefined locations. In yet other instances, the predefined condition is defined such that the received location verification information satisfies the predefined condition when a number of verifying locations from a group of verifying locations is greater than a predetermined threshold, where each verifying location from the group of verifying locations is within a predetermined distance from at least one predefined location from the set of predefined locations.

The method further includes sending a response to the request to a destination associated with the account when the received location verification information satisfies the predefined condition. The response includes confidential information associated with the account. Additionally, the method includes sending an error message when the received location verification information fails to satisfy the predefined condition. The error message indicates the failure of the received location verification information.

In some embodiments, a mobile device includes one or more processors and memory storing one or more programs for execution by the one or more processors. The one or more programs include instructions for performing the operations of the account management method described herein. In some embodiments, a non-transitory computer readable storage medium stores one or more programs including instructions for execution by one or more processors. The instructions, when executed by the one or more processors, cause the processors to perform the operations of the account management method described herein.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the technical solutions and advantages of the present application comprehensible, embodiments of the present application are further described in detail below with reference to the accompanying drawings.

Figure 1:
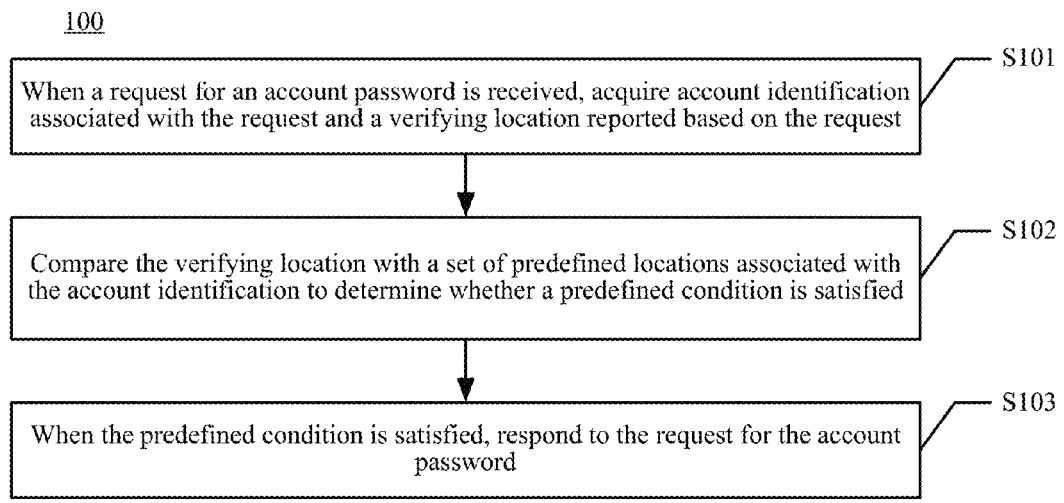
FIG. 1 is a flowchart illustrating an account management method in accordance with some embodiments.

FIG. 1 is a flowchart illustrating an account management method 100 in accordance with some embodiments. The method 100 is performed at a server including one or more processors and memory. The server is configured to store and/or execute various applications that require user account information (e.g., user name, password) for user authentication. Thus, the server is configured to store and manage information and/or data associated with the user account. Furthermore, the server is configured to be operatively coupled to (e.g., via a wireless connection) and communicate with (e.g., using a wireless communication protocol) a mobile device. In some embodiments, the method 100 is governed by instructions or code that are stored in a non-transitory computer readable storage medium of the server and executed by the one or more processors of the server. As a result of the method 100 being performed, account information such as an account password can be retrieved from the server. As shown in FIG. 1, the account management method 100 includes the following steps.

At S101, when a request for an account password is received at the server, the server acquires account identification associated with the request and a verifying location reported based on the request. In some embodiments, the server receives the request from the mobile device in response to an operation performed by a user on the mobile device. In some embodiments, the user performs the operation in order to retrieve account information and/or data such as, for example, a lost password (e.g., forgotten by the user, erased from a memory of the mobile device) associated with an application executed at the mobile device. For example, the user forgets a password of a user account and attempts to retrieve the lost password by initiating the request. In some other embodiments, the user performs the operation in order to gain access to user account management at the server. For example, the user initiates the request to reset the account password. In other embodiments, the request can be initiated by the user to access and manage the user account for any matter from the mobile device.

In some embodiments, the account identification associated with the request can include any information that can (uniquely) identify the user account such as, for example, a username, the user's last and/or first name, an email address, a mailing address, a phone number, and/or any other information registered with the user account. In some embodiments, such account identification can be included in the request and thus received at the server. The server can then retrieve account information and/or data associated with the user account based at least in part on the account identification.

Information of the verifying location can be defined at the mobile device in various methods. In some embodiments, the user can define the verifying location by entering location information to the mobile device. For example, the user can enter longitude and latitude coordinates of a location (e.g., 22° 32' 0" N/114° 8' 0" E), a relative position of a location (e.g., 10 kilometers south from the Statue of Liberty), approximate information of a location (e.g., the crossing of E street and 12th street, a mailing address, a landmark), and/or the like. In some other embodiments, a location of the mobile device at a certain time (e.g., at present, 1 hour ago, at 12 PM yesterday, etc.) can be used as the verifying location. In such embodiments, the mobile device can determine the location using, for example, a GPS of the mobile device, a built-in positioning module of the mobile device, and/or any other suitable device, unit, component or module capable of determining the location of the mobile device at a certain time.

Information of the verifying location can be sent from the mobile device to the server in any suitable method. In some embodiments, information of the verifying location can be included in the request. In other embodiments, information of the verifying location can be sent from the mobile device to the server separately from the request. For example, upon receiving the request, the server sends a signal to the mobile device to prompt the user to enter a verifying location on the mobile device. Information of a received verifying location is then sent from the mobile device to the server.

After the server receives the account identification (e.g., included in the request) and the information of the verifying location (e.g., included in the request or sent separately from the request), at S102, the server compares the verifying location with a set of predefined locations associated with the account identification to determine whether a predefined condition is satisfied. In some embodiments, the predefined condition is set in a way such that the predefined condition is satisfied when at least one distance between the verifying location and a predefined location is less than (or not greater than) a distance threshold (e.g., 1 kilometer, 100 meters, etc.). In other words, the predefined condition is satisfied when the verifying location falls within a circular area that is centered at a predefined location and has a radius of the distance threshold.

The set of predefined locations associated with the account identification can be predefined and stored at the server (e.g., a memory of the server) or a device (e.g., a database) accessible to the server. The set of predefined locations can include one or multiple predefined locations. In some embodiments, the user is required to provide, in a register request, a set of registering locations associated with the user account before the account management service (including the service to retrieve any lost account password) is available to the user. Specifically, when or after the user account is generated, the user is required to provide information of the set of registering locations in the register request. The received information of the registering locations is then stored and linked to the user account (including the account identification) at the server or the device accessible to the server. As a result, the set of registering locations is set, based on the register request, as the set of predefined locations associated with the user account. Thus, upon receiving the request including the account identification, the server can retrieve information of the predefined location(s) associated with the user account (e.g., from the memory of the server or the device accessible to the server).

In some embodiments, the user can provide the information of the predefined location(s) using the mobile device or any other device operatively coupled to the server or the device accessible to the server. Furthermore, similar to providing information of the verifying location, information of the predefined location(s) can be provided by the user, from the mobile device, or in any other suitable method. For example, the user can enter information of a predefined location (e.g., coordinates, an approximate description) using a computer different than the mobile device. The entered information of the predefined location is then included in a register request and sent to the server. For another example, the mobile device can determine a present location using a GPS of the mobile device. Information of the present location is then included in a register request and sent to the server. In some embodiments, information of various predefined locations can be provided to the server using different methods.

After the server retrieves information of the predefined locations (e.g., from the memory of the server or a device accessible to the server), the server compares information of the set of predefined locations with the received information of the verifying location. As a result of the comparison, the server determines whether a distance between the verifying location and any predefined location from the set of predefined locations is less than (or not greater than) the distance threshold. The comparison can be performed in any suitable methods. For example, the verifying location can be compared to each predefined location one by one, until a resulted distance less than (or not greater than) the distance threshold is found. For another example, distances between the verifying location and each predefined location can be calculated, and then the shortest distance is compared with the distance threshold.

Additionally, distances between the verifying location and the predefined locations can be calculated in any suitable method. For example, a pair of a longitude coordinate and a latitude coordinate can be determined (or estimated) for the verifying location and each predefined location based on the available information (e.g., an approximate description of a location). A distance between the verifying location and a predefined location can then be calculated based on the determined (or estimated) coordinates of the verifying location and the predefined location.

At S103, when the predefined condition is satisfied, the server responds to the request for an account password. The predefined condition being satisfied indicates that the user (or the mobile device sending the request and the verifying location) is authorized to access confidential information of the user account. As a result, in some embodiments, the server sends a response to the request to a destination associated with the user account. The destination can be the mobile device or any other device, address or receiving means that is registered with the user account. The response to the request can include confidential information of the user account such as, for example, a password, an email address, a phone number, a username, any other personal information of the user, and/or the like. For example, in response to the predefined condition being satisfied, the server sends an email including instructions for resetting a password of the user account to an email address registered with the user account. For another example, in response to the predefined condition being satisfied, the server sends, to the mobile device, a text message including a hint to a lost password. For yet another example, in response to the predefined condition being satisfied, the server initiates a process to reset a password for the user account, causing the mobile device to display a user interface to the user for resetting the password. In some embodiments, in response to the predefined condition being satisfied, the server provides the user (e.g., via the mobile device) with an access to account management, through which the user can manage the user account using the mobile device.

Figure 2:
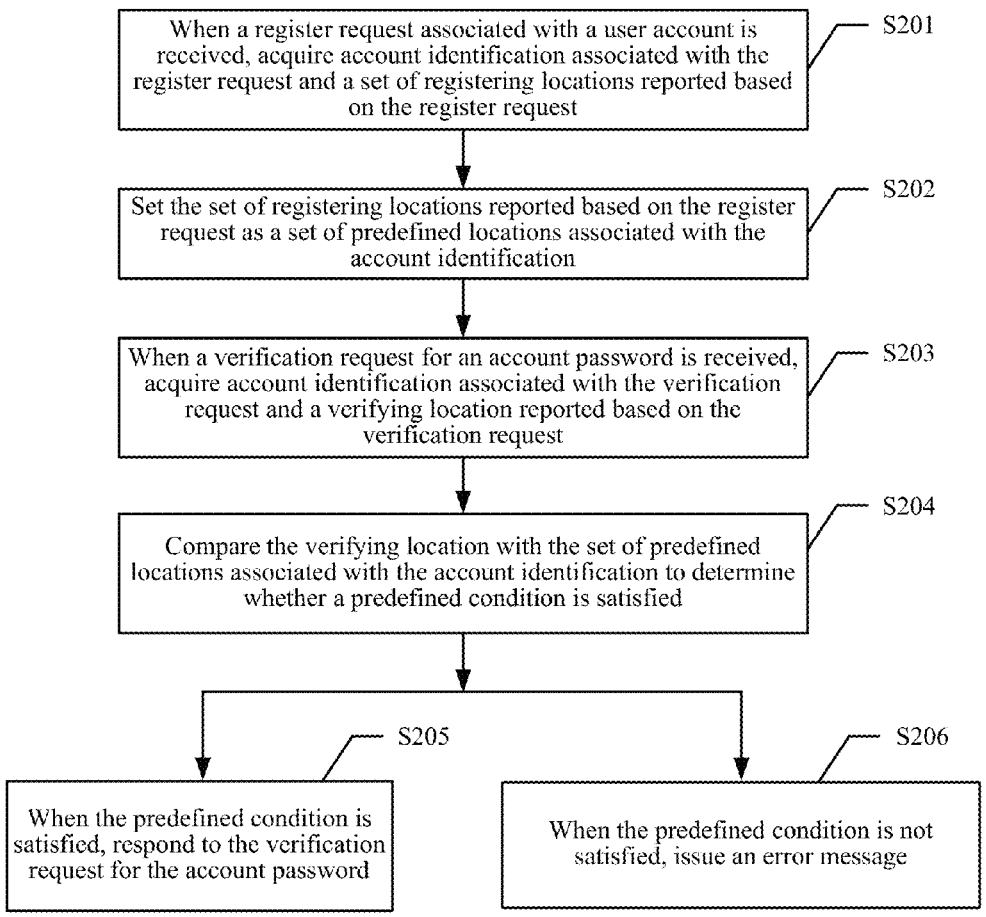
FIG. 2 is a flowchart of another account management method in accordance with some embodiments.

FIG. 2 is a flowchart of another account management method 200 in accordance with some embodiments. Similar to the method 100 shown and described above with respect to FIG. 1, the method 200 is performed at a server including one or more processors and memory. The server is configured to be operatively coupled to (e.g., via a wireless connection) and communicate with (e.g., using a wireless communication protocol) a mobile device. In some embodiments, the method 200 is governed by instructions or code that are stored in a non-transitory computer readable storage medium of the server and executed by the one or more processors of the server. As a result of the method 200 being performed, account information such as an account password can be retrieved from the server. As shown in FIG. 2, the account management method 200 includes the following steps.

At S201, when a register request associated with a user account is received, the server acquires account identification associated with the register request and a set of registering locations reported based on the register request. The set of registering locations can include one or multiple registering locations. A user can initiate the register request when the user registers a username and sets a password for a user account. The register request can be used for subsequent account management such as, for example, retrieving or resetting the password, accessing confidential information of the user account, and/or the like. The account identification (e.g., a username, the user's last and/or first name, an email address, a phone number, etc.) can be used to (uniquely) identify the user account. The account identification can be included in the register request.

As discussed above with respect to the method 100 in FIG. 1, the set of registering locations can be defined in any suitable method such as, for example, entered by the user, generated by a GPS of the mobile device, determined using a positioning technique, etc. A registering location can be, for example, a present location of the mobile device, a location of the mobile device at any past moment, a location at which the mobile device has never been, or any arbitrary location defined by the user. Furthermore, the user can provide information of the set of registering locations to the server in various methods by using the mobile device or any other device that can communicate with the server.

After receiving the register request and information of the set of registering locations, at S202, the server sets the set of registering locations reported based on the register request as a set of predefined locations associated with the account identification. Specifically, the server associates the set of registering locations with the user account (e.g., including the account identification) based on the register request (e.g., based on the account identification included in the register request). The server also sets the set of registering locations as the set of predefined locations associated with the user account.

The server can store information of the set of predefined locations (with other information and/or data of the user account) in a memory of the server or a device (e.g., a database) accessible to the server. Information of the set of predefined locations can be stored with other information and/or data of the user account in any suitable manner. For example, a table of mapping relationships among usernames, passwords and predefined locations can be established to facilitate subsequent comparison of predefined location(s) and verifying location(s). In some embodiments, information of a predefined location is transformed to a unified form (e.g., coordinates) before it is stored. In other embodiments, information of a predefined location is stored in the form in which that information is originally received (e.g., a mailing address, a landmark).

In some embodiments, when multiple registering locations associated with one user account are reported, the server can calculate distances between each registering location and each other registering location. When a distance between two registering locations is less than a predetermined minimum distance (e.g., 1 kilometer, 100 meters), the two registering locations are considered as one location (because they are too close to each other for the server to distinguish). Thus, only one of the two registering locations is associated and stored with the user account. Additionally, a message can be sent to the user indicating the error and/or prompting the user to enter a new registering location that satisfies the minimum-distance requirement.

In some embodiments, each user account having predefined location(s) can be identified or marked as a user account enabled with a location-based account management service. As described herein, subsequent account management (e.g., retrieving or resetting a password) on such a user account can be facilitated based on location information (e.g., verifying location(s), predefined location(s)) associated with that user account.

Performing the steps S201 and S202 completes a location presetting process associated with the user account. The user can perform such a location presetting process to enable a location-based account management service for the user account. After the location presetting process (including the steps S201 and S202) is completed, subsequent account management (e.g., retrieving a password, resetting a password, accessing confidential account information, etc.) can be provided upon location-based user authentication is performed. Specifically, to perform the location-based user authentication, a user operates the mobile device to send a verification request associated with the user account (e.g., a verification request for an account password) to the server. Accordingly, the server performs the following steps S203-S206.

At S203, when the server receives the verification request, the server acquires account identification associated with the verification request and a verifying location reported based on the verification request. In some embodiments, the account identification can be a username or any other type of identification included in the verification request. The verifying location can be included in the verification request or sent from the mobile device separately from the verification request. For example, after the verification request is sent from the mobile device to the server, the mobile device prompts the user to report the verifying location. As discussed above with respect to the method 100 in FIG. 1, the verifying location can be entered by the user or determined by a built-in positioning module (e.g., a GPS module, a base station positioning module) of the mobile device.

After the server receives the account identification and information of the verifying location, at S204, the server compares the verifying location with the set of predefined locations associated with the account identification to determine whether a predefined condition is satisfied. As discussed above with respect to the method 100 in FIG. 1, in some embodiments, the predefined condition can be set in a way such that the predefined condition is satisfied when at least one distance between the verifying location and a predefined location is less than (or not greater than) a distance threshold.

In some embodiments, a verifying location can be compared to a predefined location by calculating a distance between the two locations. In such embodiments, the calculated distance can be an estimation of the actual distance based on approximate descriptions of the two locations (e.g., a mailing address, a landmark, a relative location, etc.), or a more accurate measurement of the actual distance calculated based on more accurate representations of the two locations (e.g., coordinates). For example, an estimated distance can be calculated between a verifying location described as 1800 Pennsylvania Avenue NW, Washington, D.C., and a predefined location described as the Capitol Hill. For another example, a more accurate distance can be calculated between a verifying location with longitude and latitude coordinates (41.40338, 2.17403) and a predefined location with longitude and latitude coordinates (41.62484, 2.90521). Furthermore, in some embodiments, a distance between a verifying location and a predefined location can be determined in an intelligent manner without transforming representations of the two locations into coordinates. For example, a distance between a verifying location described as 300 meters north of the Statue of Liberty and a predefined location described as 400 meters east of the Statue of Liberty can be (intelligently) determined as 500 meters.

In some embodiments, a verifying location can be compared to a predefined location by using any other suitable method without calculating a distance between the two locations. In such embodiments, a verifying location and a predefined location can be compared, for example, by (intelligently) matching the descriptions of the two locations. For example, a verifying location described as a landmark (e.g., the White House) is considered to match a predefined location described as the same landmark. For another example, it can be (intelligently) determined that a verifying location described as the crossing of E Street and 12th Street is one block away from a predefined location described as the crossing of F Street and 12th Street, which can satisfy a predefined condition or not based on the predetermined distance.

Based on the comparison result, at S205, when the predefined condition is satisfied, the server responds to the verification request for the account password. Specifically, the location-based user authentication is completed, and as a result, the servers sends a response to a destination (e.g., the mobile device or any other device or receiving means) associated with the user account, where the response includes confidential information (e.g., the original account password, a temporal account password, instructions for resetting the account password) of the user account. Alternatively, the server can provide the user with access to management operations of the user account. With such access, the user can, for example, manage the user account using the mobile device.

Otherwise, at S206, when the predefined condition is not satisfied, the server issues an error message indicating the failure of the location-based user authentication. Such an error message can indicate, for example, a password retrieval error, a password resetting error, an account management access error, and/or the like. In some embodiments, the error message can prompt the user for another attempt on user authentication. In such embodiments, the user can be prompted to, for example, enter another account identification (e.g., a username, an email, a phone number, a last name), provide another verifying location, and/or the like.

Performing the steps S203-S206 completes a location-based user authentication process. In such a location-based user authentication process, the user's identity (or the mobile device's identity) is verified based on the verifying location reported by the user. An affirmative response to the verification request (e.g., access to confidential information of the user account) is provided when the user authentication is successful (i.e., the predefined condition is satisfied by the reported verifying location). Since such a verifying location required for the user authentication is not as vulnerable to hacking as a mailbox, an email account or a phone number, the location-based user authentication mechanism can effectively prevent unauthorized, unauthenticated or illegal access to confidential information of the user account (e.g., unauthorized retrieval or resetting of an account password). As a result, security of account management is better ensured. Moreover, a verifying location generally does not change over time. Thus, the problem of losing access to account management due to failure or terminated service of a mailbox, an email address or a phone number can be avoided.

Figure 3:
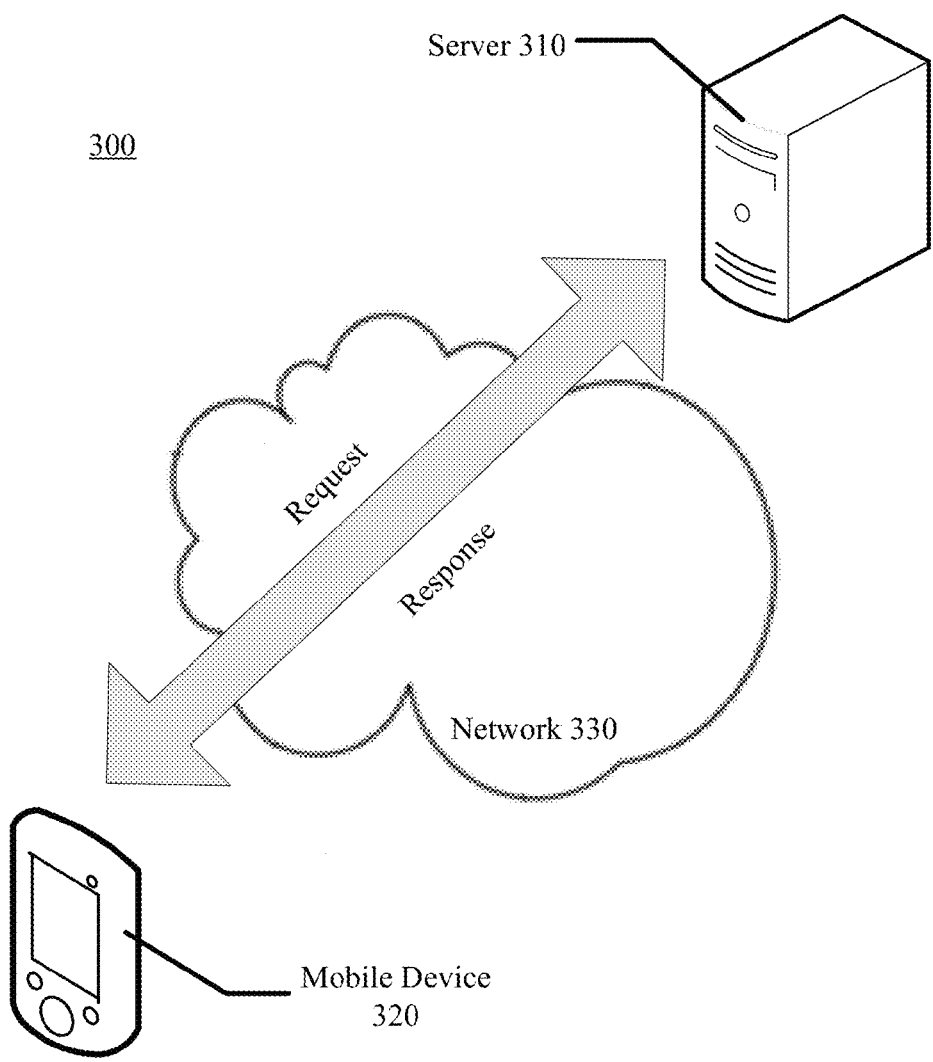
FIG. 3 is a schematic diagram illustrating an account management system in accordance with some embodiments.

FIG. 3 is a schematic diagram illustrating an account management system 300 in accordance with some embodiments. As shown in FIG. 3, the system 300 includes a server 310 and a mobile device 320. The server 310 is operatively coupled to and communicates with the mobile device 320 via a network 330. Although shown in FIG. 3 as including a single server and a single mobile device, in other embodiments, an account management system can include any number of servers and any number of mobile devices. Each server included in such an account management system can be identical or similar to the server 310, and each mobile device included in such an account management system can be identical or similar to the mobile device 320.

The network 330 can be any type of network that operatively couples one or more servers (e.g., the server 310) to one or more mobile devices (e.g., the mobile devices 320), and enables communications between the server(s) and the mobile device(s). In some embodiments, the network 330 can include, for example, a cellular network, a local area network (LAN), a wide area network (WAN), a wireless local area network (WLAN), etc. In some embodiments, the network 330 can include the Internet. The network 330 can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

The server 310 can be structurally and functionally similar to the servers described above with respect to the methods 100 and 200 in FIGS. 1-2. Specifically, the server 310 can be any device configured to communicate with (via the network 330) and provide a location-based account management service to one or more mobile devices (e.g., the mobile device 320) and associated users. In some embodiments, the server 310 can be, for example, a background server, a back end server, a database server, a workstation, a desktop computer, a cloud computing server, a data processing server, and/or the like. In some embodiments, the server 310 can be a server cluster consisting of two or more servers (e.g., a data processing server and a database server).

The mobile device 320 can be structurally and functionally similar to the mobile devices described above with respect to the methods 100, 200 in FIGS. 1-2. Specifically, the mobile device 320 can be any electronic device configured to communicate with the server 310 (via the network 330) to provide the location-based account management service to a user. In some embodiments, the mobile device 320 can be, for example, a mobile phone, a smart phone, a mobile Internet device (MID), a tablet, an e-reader, a remote controller, a personal digital assistant (PDA), a vehicle-mounted equipment, a wearable device, a laptop computer, a handheld computer, and/or any other portable electronic device. In some embodiments, a mobile device can also be referred to as, for example, a user device, a user terminal, a portable device, a client device, and/or the like.

In some embodiments, as described herein, the server 310 and the mobile device 320 can be collectively configured to provide the location-based account management service to a user of the mobile device 320. In such embodiments, the server 310 can be configured to store and/or manage user accounts. Particularly, in some instances, the server 310 can be configured to host one or more applications that require user authentication (e.g., a username and a password) based on the user accounts. In such instances, the server 310 can be configured to store, control and/or execute a server-side portion of each of the applications. Meanwhile, the mobile device 320 can be configured to store, control and/or execute a client-side portion of the corresponding applications.

To execute such an application, the user is required to be authenticated at the mobile device. A normal user authentication typically involves, for example, a username and a password. For example, the user is prompted to enter a username and a password, which will be verified by the client-side portion or the server-side portion of the application based on information of the user account. In certain scenarios, when a normal user authentication fails (e.g., due to an incorrect username or a missing password) or when a normal user authentication is not sufficient (e.g., a high-level user authentication is required to access certain confidential information of the user account or to perform certain restricted management operations on the user account), the user can be authenticated by performing the location-based user authentication described herein.

As shown and described above with respect to FIGS. 1-2, to perform the location-based user authentication, the server 310 and the mobile device 320 can collectively perform the method 100 and/or the method 200. Specifically, the user can operate the mobile device 320 to send a verification request including account identification (e.g., a username) to the server 310, and report a verifying location to the server 310. In response to the verification request, the server 310 can determine whether a predefined condition is satisfied by the verifying location. When the predefined condition is satisfied by the verifying location, the user is authenticated. Otherwise, the user authentication fails.

Figure 4:
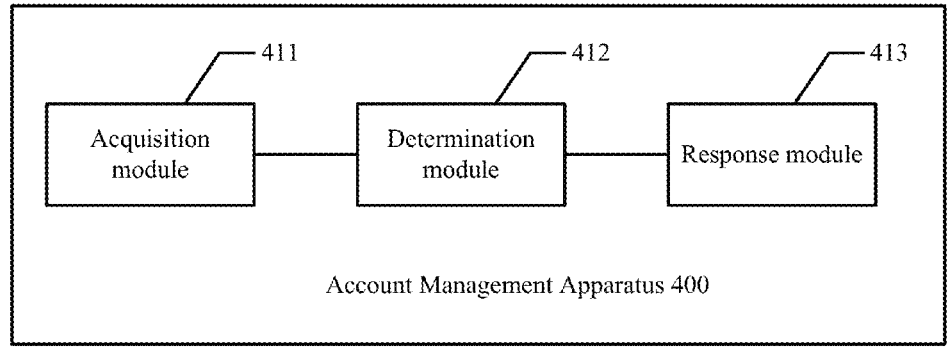
FIG. 4 is a block diagram of an account management apparatus in accordance with some embodiments.

FIG. 4 is a block diagram of an account management apparatus 400 in accordance with some embodiments. The apparatus 400 can be structurally and functionally similar to the servers shown and described above with respect to FIGS. 1-3. In some embodiments, the apparatus 400 can be included in, disposed at, or implemented at the server 300 in FIG. 3. Similar to the server 310 in FIG. 3, the apparatus 400 can be operatively coupled to (e.g., via a wireless connection) and communicate with one or more mobile devices (e.g., the mobile device 320 in FIG. 3) to provide an account management service to user(s) of the mobile device(s).

As shown in FIG. 4, the apparatus 400 includes an acquisition module 411, a determination module 412 and a response module 413. In some embodiments, each module included in the apparatus 400 can be a hardware-based module (e.g., a digital signal processor (DSP), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus 400 (not shown in FIG. 4) and executed at a processor (e.g., a CPU) of the apparatus 400 (not shown in FIG. 4). In some embodiments, although not shown in FIG. 4, the apparatus 400 can include more or less modules or components than those shown in FIG. 4.

The modules of the apparatus 400 (including the acquisition module 411, the determination module 412 and the response module 413) can be configured to collectively perform a server-side portion of user authentication associated with a user account, thus providing an account management service to a user of the mobile device. Specifically, the acquisition module 411 is configured to, in response to the apparatus 400 receiving a verification request from the mobile device, acquire account identification (e.g., a username) and a verifying location associated with the verification request. In some embodiments, the acquisition module 411 acquires the account identification and/or information of the verifying location from the verification request. In some embodiments, the acquisition module 411 acquires, from the mobile device and through interaction with a user of the mobile device, the information of the verifying location separately from the verification request.

The determination module 412 is configured to determine whether the acquired verifying location satisfies a predefined condition. In some embodiments, the determination module 412 is configured to retrieve, based on the authentication identification, information of a set of predefined locations associated with the user account. In some embodiments, as described herein, the predefined condition can be based on a comparison between a predetermined distance and distances from the verifying location to a set of predefined locations. As a result of the determination, when the acquired verifying location satisfies the predefined condition, the user (or the mobile device) is authenticated and thus provided with access to confidential information of the user account. Otherwise, the user (or the mobile device) is not authenticated and thus denied access to confidential information of the user account.

The response module 413 is configured to generate and send a response to the mobile device based on the determination made at the determination module 412. When the user is authenticated as the result of the determination, the response module 413 can send a response including confidential information (e.g., a password, personal information of the user, registered information of the user account, etc.) of the user account to the mobile device. After receiving the confidential information of the user account, the user can be authenticated and execute an application at the mobile device. In some embodiments, the response module 413 can send instructions (e.g., a link) for accessing confidential information of the user account to the mobile device. As a result, the user can access confidential information of the user account and/or manage the user account using the mobile device.

Figure 5:
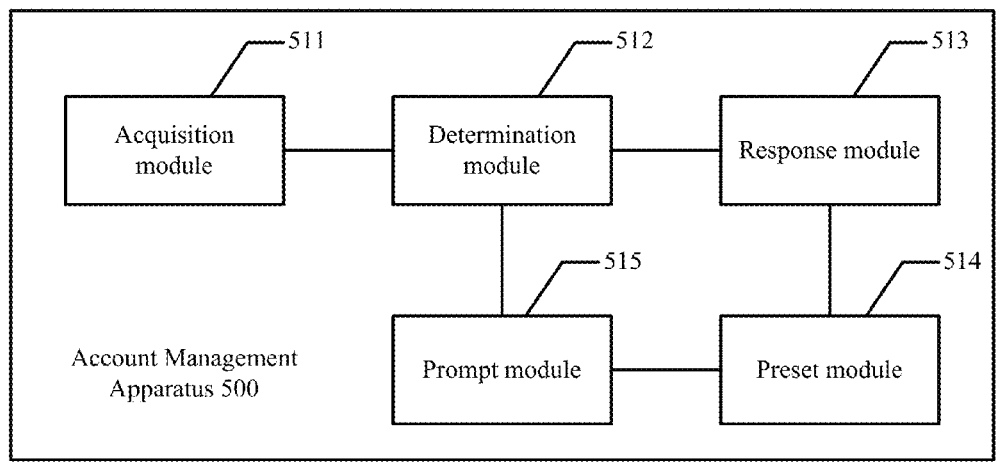
FIG. 5 is a block diagram of another account management apparatus in accordance with some embodiments.

FIG. 5 is a block diagram of another account management apparatus 500 in accordance with some embodiments. The apparatus 500 can be structurally and functionally similar to the apparatus 400 shown and described with respect to FIG. 4, and the servers shown and described with respect to FIGS. 1-3. Similar to the server 310 in FIG. 3, the apparatus 500 can be operatively coupled to (e.g., via a wireless connection) and communicate with one more mobile devices (e.g., the mobile device 320 in FIG. 3) to provide an account management service to user(s) of the mobile device(s).

As shown in FIG. 5, the apparatus 500 includes an acquisition module 511, a determination module 512, a response module 513, a preset module 514, and a prompt module 515. In some embodiments, each module included in the apparatus 500 can be a hardware-based module (e.g., a DSP, a FPGA, etc.), a software-based module (e.g., a module of computer code executed at a processor, a set of processor-readable instructions executed at a processor, etc.), or a combination of hardware and software modules. Instructions or code of each module can be stored in a memory of the apparatus 500 (not shown in FIG. 5) and executed at a processor (e.g., a CPU) of the apparatus 500 (not shown in FIG. 5). In some embodiments, although not shown in FIG. 5, the apparatus 500 can include more or less modules or components than those shown in FIG. 5.

The modules of the apparatus 500 (including the acquisition module 511, the determination module 512, the response module 513, the preset module 514, and the prompt module 515) can be configured to collectively perform a server-side portion of user authentication associated with a user account, thus providing an account management service to a user of the mobile device. Similar to the acquisition module 411 of the apparatus 400 in FIG. 4, the acquisition module 511 is configured to, in response to the apparatus 500 receiving a verification request from the mobile device, acquire account identification and a verifying location associated with the verification request. Similar to the determination module 412 of the apparatus 400 in FIG. 4, the determination module 512 is configured to determine whether the acquired verifying location satisfies a predefined condition. Similar to the response module 413 of the apparatus 400 in FIG. 4, the response module 513 is configured to generate and send a response to the mobile device based on the determination made at the determination module 512.

Furthermore, the preset module 514 is configured to, in response to the apparatus 500 receiving a register request and a set of registering locations, determine a user account associated with the register request and set a set of predefined locations for the user account based on the set of registering locations. Specifically, the preset module 514 can acquire account identification (e.g., a username, a last name or first name of the user, an email address, a phone number) from the register request. The preset module 514 can determine a user account based on the account identification. The preset module 514 can then associate the set of registering locations with the user account, and set the set of predefined locations for the user account based on the set of registering locations.

In some embodiments, the preset module 514 can store information of the set of predefined locations (with other information and/or data of the user account) in a memory of the apparatus 500 or a device (e.g., a database) accessible to the apparatus 500. Information of the set of predefined locations can be stored with other information and/or data of the user account in any suitable data structure such as, for example, a table, a list, an array, etc. For example, a table of mapping relationships among usernames, passwords and predefined locations can be established to facilitate subsequent comparison of predefined location(s) and verifying location(s).

In some embodiments, when multiple registering locations associated with one user account are reported to the apparatus 500, the preset module 514 can calculate distances between each registering location and each other registering location. When a distance between two registering locations is less than a predetermined minimum distance, the two registering locations are considered as one location, and only one of the two registering locations is associated and stored with the user account. Additionally, a message can be sent to the user indicating the error and/or prompting the user to enter a new registering location that satisfies the minimum-distance requirement.

In some embodiments, the preset module 514 can identify or mark each user account having predefined location(s) as a user account enabled with the location-based account management service. As described herein, subsequent account management (e.g., retrieving or resetting a password, accessing confidential information) on such a user account can be facilitated based on location information (e.g., verifying location(s), predefined location(s)) associated with that user account.

The prompt module 515 is configured to, in response to the predefined condition not being satisfied as determined at the determination module 512, issue an error message indicating the failure of the location-based user authentication. Such an error message can indicate, for example, a password retrieval error, a password resetting error, an account management access error, and/or the like. In some embodiments, the prompt module 515 can be configured to prompt the user for another attempt on user authentication. In such embodiments, the prompt module 515 can cause the mobile device to display a message prompting the user to, for example, enter another account identification (e.g., a username, an email, a phone number, a last name), provide another verifying location, and/or the like.

It should be understood that, specific implementations of the modules in the account management apparatuses 400 and 500 in FIGS. 4-5 can be referred to descriptions about the embodiments corresponding to FIGS. 1-3.

Figure 6:
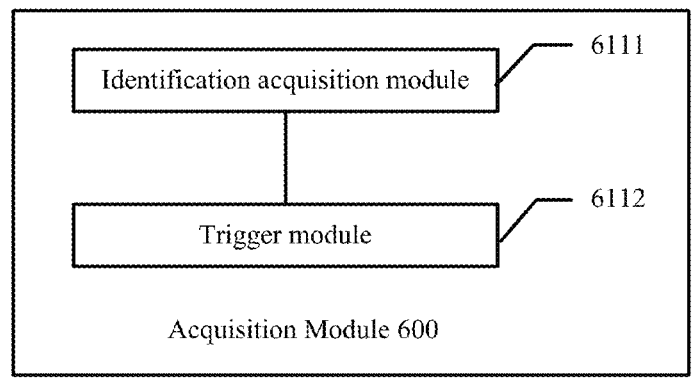
FIG. 6 is a block diagram of an acquisition module in an account management apparatus in accordance with some embodiments.

FIG. 6 is a block diagram of an acquisition module 600 in an account management apparatus in accordance with some embodiments. The acquisition module 600 can be structurally and functionally similar to the acquisition modules 411 and 511 shown and described with respect to FIGS. 4-5. The apparatus (not shown in FIG. 6) hosting the acquisition module 600 can be a server interacting with one or more mobile devices to provide an account management service to user(s) of the mobile device(s).

As shown in FIG. 6, the acquisition module 600 includes at least two sub-modules: an identification acquisition module 6111 and a trigger module 6112. In some embodiments, each sub-module included in the acquisition module 600 can be a hardware-based module (e.g., a DSP, a FPGA, etc.), a software-based module (e.g., a module of computer code executed at a processor, a set of processor-readable instructions executed at a processor, etc.), or a combination of hardware and software modules. Instructions or code of each sub-module can be stored in a memory of the apparatus hosting the acquisition module 600 and executed at a processor (e.g., a CPU) of that apparatus. In some embodiments, although not shown in FIG. 6, the acquisition module 600 can include more than two sub-modules.

The identification acquisition module 6111 is configured to, in response to receiving a verification request from the mobile device, acquire account identification from the verification request. Such account identification can be any type of information or data that can (uniquely) identify a user account associated with the verification request, such as, for example, a username, an email address or a phone number registered with the user account, etc.

The trigger module 6112 is configured to, in response to receiving a verification request from the mobile device, trigger a user of the mobile device to report a verifying location associated with the verification request. Specifically, the trigger module 6112 can send a signal to the mobile device, causing the mobile device to prompt the user to enter a verifying location using a user interface of the mobile device. Details of a mobile device prompting a user to enter a verifying location are further shown and described with respect to FIGS. 7-8.

In some embodiments, a user authentication process can require a user to report multiple verifying locations. In such embodiments, in response to receiving the multiple verifying locations, a server (or an account management apparatus) can determine whether the multiple verifying locations satisfy a predefined condition by comparing the multiple verifying locations with a set of predefined locations. User authentication is successful when the predefined condition is satisfied. Specifically, the server can compare each verifying location from the multiple verifying locations with the set of predefined locations. The determination on user authentication can be based on a collective comparison result of the multiple verifying locations.

Various mechanisms can be implemented for the determination on user authentication. In some embodiments, for example, the predefined condition can be set in a way such that the predefined condition is satisfied when at least one distance between a verifying location from the multiple verifying locations and a predefined location from the set of predefined locations is less than (or not greater than) a predetermined distance.

In such embodiments, each verifying location can be compared with the set of predefined locations one by one, until one verifying location having a distance to a predefined location that is less than the predetermined distance is found. Once a verifying location having a distance to a predefined location that is less than the predetermined distance is found, the server can suspend or terminate receiving subsequent verifying location(s). For example, the server can send a signal to the mobile device, prompting or indicating the use to refrain from reporting any new verifying location.

Alternatively, each verifying location from the multiple verifying locations can be compared with each predefined location from the set of predefined locations to determine a shortest distance between any verifying location and any predefined location. That shortest distance can then be compared to the predetermined distance. When the shortest distance is less than the predetermined distance, then the predefined condition is satisfied. Otherwise, the predefined condition is not satisfied.

In some other embodiments, for example, the predefined condition can be set in a way such that the predefined condition is satisfied when each verifying location from the multiple verifying locations is within a predetermined distance from at least one predefined location from the set of predefined locations. In such embodiments, each verifying location from the multiple verifying locations can be compared with the set of predefined locations to determine a shortest distance between that verifying location and any predefined location. The shortest distances of the multiple verifying locations can then be compared to the predetermined distance. When every shortest distance is less than the predetermined distance, then the predefined condition is satisfied. Otherwise, the predefined condition is not satisfied.

In yet some other embodiments, for example, the predefined condition can be set in a way such that the predefined condition is satisfied when each of a certain number of verifying locations from the multiple verifying locations is within a predetermined distance from at least one predefined location from the set of predefined locations. In other words, the predefined condition is satisfied when a number of verifying locations from a group of verifying locations is greater than a predetermined threshold, where each verifying location from the group of verifying locations is within the predetermined distance from at least one predefined location from the set of predefined locations.

In such embodiments, each verifying location can be compared with the set of predefined locations, and marked (as a satisfying verifying location) when that verifying location is within the predetermined distance from at least one predefined location from the set of predefined locations. The number of satisfying verifying locations is counted. Each verifying location is checked in such a way until the number of satisfying verifying locations is greater than the predetermined threshold. Once a certain number (e.g., the predetermined threshold plus 1) of satisfying verifying locations are identified, the server can suspend or terminate receiving subsequent verifying location(s). For example, the server can send a signal to the mobile device, prompting or indicating the use to refrain from reporting any new verifying location.

Alternatively, each verifying location from the multiple verifying locations can be compared with the set of predefined locations to determine a shortest distance between that verifying location and any predefined location. The shortest distances of the multiple verifying locations can then be compared to the predetermined distance. When the number of verifying locations having a shortest distance less than the predetermined distance is greater than the predetermined threshold, then the predefined condition is satisfied. Otherwise, the predefined condition is not satisfied.

In some embodiments, the predetermined threshold (on the number of the satisfying verifying locations) can be independent of the total number of verifying locations that are reported by the user. In other embodiments, the predetermined threshold can be set based on the total number of verifying locations that are reported by the user. Particularly, in some embodiments, the predetermined threshold can be set as a ratio (e.g., 75%) of the total number of reported verifying locations. For example, a user is required to report 4 verifying locations, and the user authentication is successful (i.e., the predefined condition is satisfied) when at least 75% of the 4 verifying locations (i.e., 3 of the 4 verifying locations) are determined to be a satisfying verifying location (i.e., having a distance to a predefined location that is less than the predetermined distance).

Figure 7:
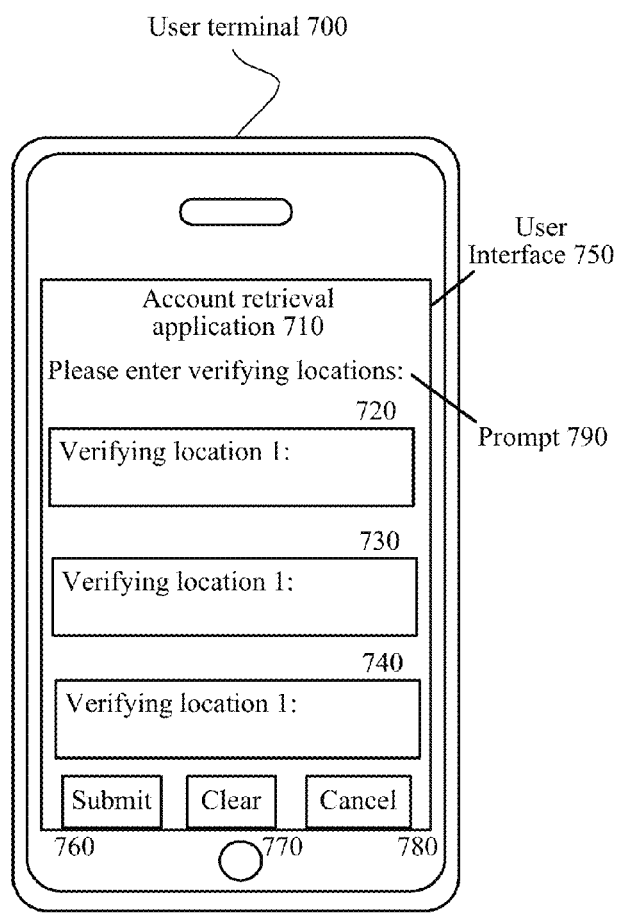
FIG. 7 is a schematic diagram illustrating a user interface associated with a method for retrieving account information in accordance with some embodiments.

When multiple verifying locations are required for the user authentication process, the user can be prompted by the mobile device to report the multiple verifying locations in any suitable manner. In some embodiments, the user can be prompted to report every verifying location before a determination on user authentication can be made at the server. FIG. 7 is a schematic diagram illustrating a user interface 750 of a user terminal 700 implementing such a reporting mechanism. The user terminal 700 can be structurally and functionally similar to the mobile devices shown and described above with respect to FIGS. 1-6.

As shown in FIG. 7, in executing an account retrieval application 710, the user interface 750 displays a prompt 790 ("Please enter verifying locations") to prompt the user to enter multiple verifying locations. The user can enter three verifying locations at the data entry blocks 720, 730 and 740. Alternatively, although not shown in FIG. 7, the user can trigger a built-in positioning module (e.g., a GPS module) of the user terminal 700 to determine a location of the user terminal 700 and report that location as a verifying location to the server. After entering the verifying locations, the user can click the submit button 760 to report the entered verifying locations to the server. Alternatively, the user can clear the data entries in the data entry blocks 720, 730 and/or 740 by clicking the clear button 770, or cancel the user authentication process by clicking the cancel button 780, at any time when the user is at the user interface 750.

Additionally, in some embodiments, the user can enter and report (i.e., submit) a portion of the required multiple verifying locations, and then enter and report another portion of the required multiple verifying locations, until all the required verifying locations are reported. For example, the user can enter and report three verifying locations using the user interface 750, and then enter and report another three verifying locations using another user interface that is identical or similar to the user interface 750. For another example, the user can take the user terminal 700 to a first location, and then use a GPS module of the user terminal to report the first location as a first verifying location. Similarly, the user can take the user terminal 700 to a second location at a later time, and then use the GPS module of the user terminal to report the second location as a second verifying location, so on and so forth until all required verifying locations are reported. In any embodiment shown and described with respect to FIG. 7, the user is required to report all the required verifying locations before a determination on user authentication can be made at the server.

Figure 8:
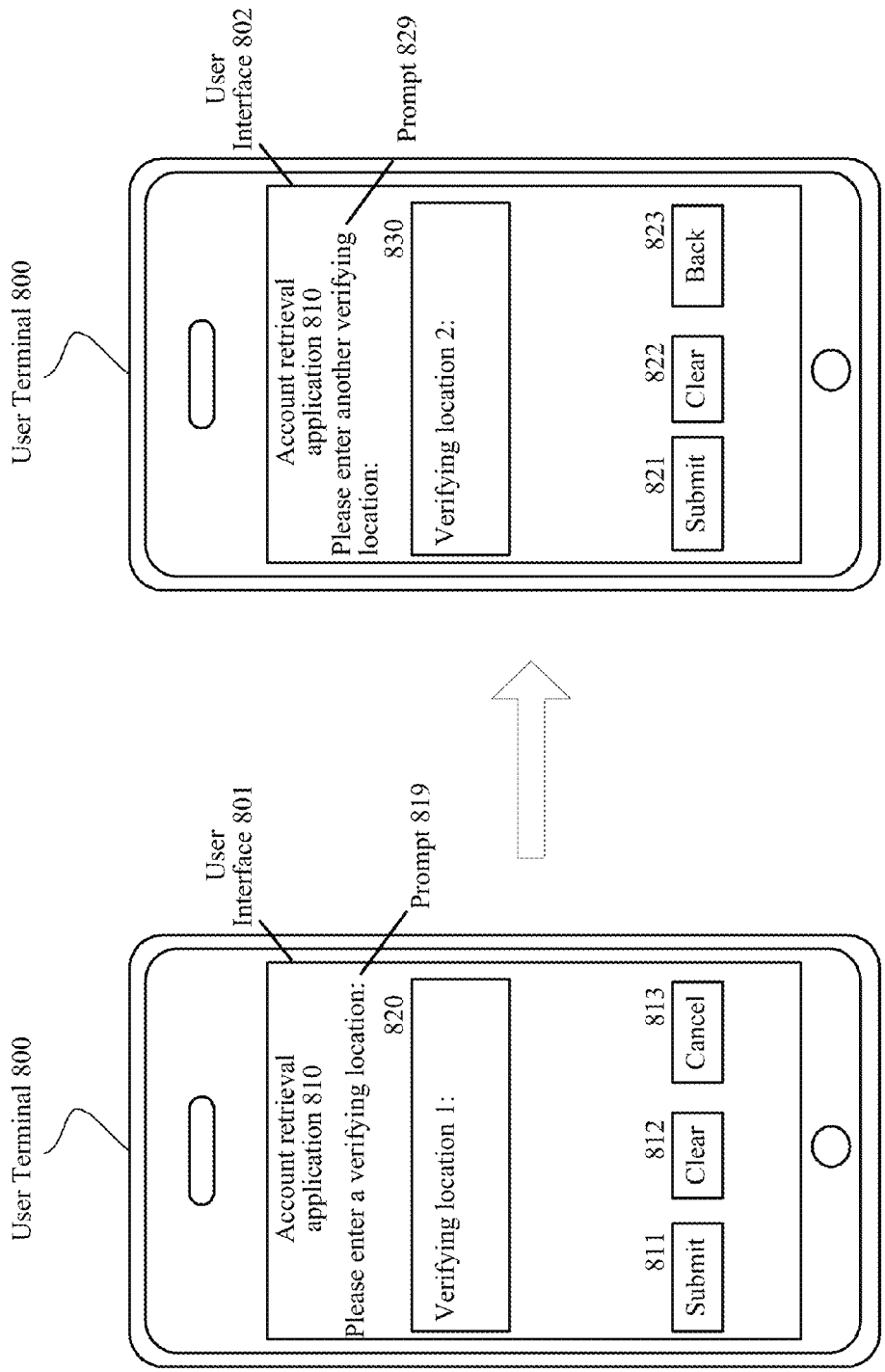
FIG. 8 is a schematic diagram illustrating user interfaces associated with another method for retrieving account information in accordance with some embodiments.

In some other embodiments, the user can be prompted to report the verifying locations one by one (or a portion after a portion) until a determination on user authentication can be made at the server. Once a determination on user authentication is made at the server, the user is not required to report any new verifying location. FIG. 8 is a schematic diagram illustrating user interfaces 801 and 802 of a user terminal 800 implementing such a reporting mechanism. The user terminal 800 can be structurally and functionally similar to the mobile devices shown and described above with respect to FIGS. 1-6.

As shown in FIG. 8, in executing an account retrieval application 810, the user interface 801 displays a prompt 819 ("Please enter a verifying location") to prompt the user to enter a first verifying location. The user can enter the first verifying location at the data entry block 820. Alternatively, although not shown in FIG. 8, the user can trigger a built-in positioning module (e.g., a GPS module) of the user terminal 800 to determine a location of the user terminal 800 and report that location as the first verifying location to the server. After entering the first verifying location, the user can click the submit button 811 to report the first verifying location to the server. Alternatively, the user can clear the data entry in the data entry block 820 by clicking the clear button 812, or cancel the user authentication process by clicking the cancel button 813, at any time when the user is at the user interface 801.

After the first verifying location is reported to the server, the server processes the first verifying location to determine whether a predefined condition is satisfied by verifying location(s) that have been received (including the first verifying location). When the server determines that the predefined condition is satisfied by the verifying location(s) that have been received, the server determines that user authentication is successful. As a result, the server sends a signal to the user terminal 800 to suspend receiving any new verifying location. Thus, a message is presented by the user terminal 800 to the user indicating the success of user authentication, and/or terminating the process of reporting verifying locations.

When the server determines that (1) the predefined condition is not satisfied by the verifying location(s) that have been received, and (2) a predetermined maximum number of verifying locations has been reached by the verifying location(s) that have been received, the server determines that user authentication fails. As a result, the server sends a signal to the user terminal 800 to suspend receiving any new verifying location. Thus, a message is presented by the user terminal 800 to the user indicating the failure of user authentication, and/or terminating the process of reporting verifying locations.

When the server determines that (1) the predefined condition is not satisfied by the verifying location(s) that have been received, and (2) a predetermined maximum number of verifying locations has not been reached by the verifying location(s) that have been received, the server sends a signal to the user terminal prompting for a new verifying location. Specifically, the user terminal 800 is triggered to display a user interface 802 to prompt the user for a new verifying location.

As shown in FIG. 8, the user interface 802 displays a prompt 829 ("Please enter another verifying location") to prompt the user to enter a second verifying location. The user can enter the second verifying location at the data entry block 830. Alternatively, although not shown in FIG. 8, the user can trigger a built-in positioning module (e.g., a GPS module) of the user terminal 800 to determine a location of the user terminal 800 and report that location as the second verifying location to the server. After entering the second verifying location, the user can click the submit button 821 to report the second verifying location to the server. Alternatively, the user can clear the data entry in the data entry block 830 by clicking the clear button 822, or cancel the user authentication process by clicking the cancel button 823, at any time when the user is at the user interface 802.

In some embodiments, the process illustrated in FIG. 8 for prompting the user for new verifying locations is repeated until a determination on user authentication is made at the server. Different from the embodiments shown and described with respect to FIG. 7, in the embodiments shown and described with respect to FIG. 8, the user is not required to report all the required verifying locations before a determination on user authentication can be made at the server. Instead, the verifying locations are reported to and processed at the server in a sequential fashion, and a determination on user authentication can be made at the server before all the required verifying locations are reported.

Figure 9:
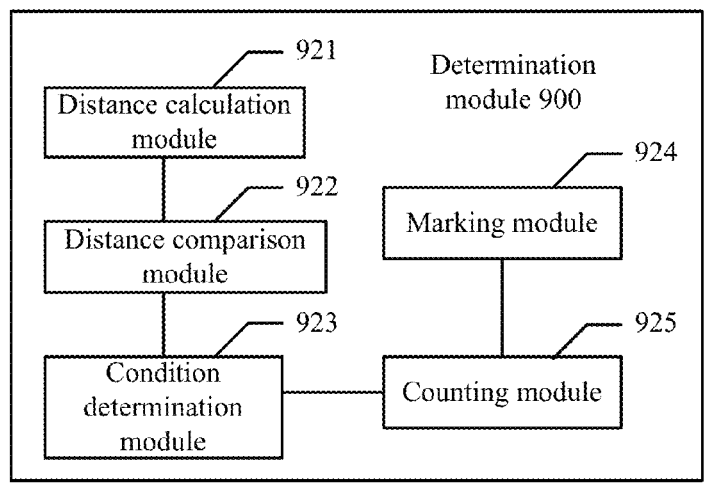
FIG. 9 is a block diagram of a determination module in an account management apparatus in accordance with some embodiments.

FIG. 9 is a block diagram of a determination module 900 in an account management apparatus in accordance with some embodiments. The determination module 900 can be structurally and functionally similar to the determination modules 412 and 512 shown and described with respect to FIGS. 4-5. The apparatus (not shown in FIG. 9) hosting the determination module 900 can be a server interacting with one or more mobile devices to provide an account management service to user(s) of the mobile device(s).

As shown in FIG. 9, the determination module 900 includes at least five sub-modules: a distance calculation module 921, a distance comparison module 922, a condition determination module 923, a marking module 924 and a counting module 925. In some embodiments, each sub-module included in the determination module 900 can be a hardware-based module (e.g., a DSP, a FPGA, etc.), a software-based module (e.g., a module of computer code executed at a processor, a set of processor-readable instructions executed at a processor, etc.), or a combination of hardware and software modules. Instructions or code of each sub-module can be stored in a memory of the apparatus hosting the determination module 900 and executed at a processor (e.g., a CPU) of that apparatus. In some embodiments, although not shown in FIG. 9, the determination module 900 can include more or less sub-modules than those shown in FIG. 9. In some embodiments, the marking module 924 and the counting module 925 are optional, and their functions can be combined into other sub-modules, simplified or eliminated from the determination module 900.

Specifically, the distance calculation module 921 is configured to calculate a distance between a given verifying location and a given predefined location. The distance calculation module 921 can calculate distances between two locations in any suitable method. In some embodiments, the distance calculation module 912 is configured to calculate a (relatively) accurate distance based on (relatively) accurate representations (e.g., longitude and latitude coordinates) of the two locations. In some other embodiments, the distance calculation module 912 is configured to calculate an estimated distance based on approximate representations (e.g., a mailing address, a landmark) of the two locations.

The distance comparison module 922 is configured to compare the distance calculated at the distance calculation module 921 with a predetermined distance. When a distance between a verifying location and a predefined location is less than (or not greater than) the predetermined distance, the verifying location is considered as a satisfying verifying location. The condition determination module 923 is configured to determine whether a predefined condition is satisfied or not based on a number of satisfying verifying locations. As described above, the predefined condition can be set in any suitable way.

In some embodiments, user authentication requires a single verifying location to be reported and compared with a set of predefined locations (including one or more predefined locations). In such embodiments, the distance calculation module 921, the distance comparison module 922 and the condition determination module 923 are sufficient to determine whether the user authentication is successful or not. Specifically, the distance calculation module 921 calculates a distance between the verifying location and each predefined location from the set of predefined locations. The distance comparison module 922 compares each calculated distance with a predetermined distance. The condition determination module 923 determines, based on the comparison result of each calculated distance, whether a predefined condition is satisfied (i.e., whether at least one of the calculated distance is less than the predetermined distance).

In other embodiments, user authentication requires more than one verifying location to be reported and compared with a set of predefined locations (including more than one predefined locations). In such embodiments, the determination module 900 optionally includes and uses the marking module 924 and the counting module 925 for user authentication. Specifically, the marking module 924 is configured to mark or identify each satisfying verifying location (i.e., a verifying location having a distance to a predefined location that is less than the predetermined distance). The counting module 925 is configured to keep track of the number of satisfying verifying locations. In other words, the counting module 925 is configured to increment a counter by one each time a verifying location is marked as a satisfying verifying location at the marking module 924.

In operation, the distance calculation module 921 calculates a distance between a verifying location from the multiple verifying locations and a predefined location from the set of predefined locations. The distance comparison module 922 compares the calculated distance with a predetermined distance. The marking module 924 marks the verifying location as a satisfying verifying location when the comparison result at the distance comparison module 922 indicates that the calculated distance is less than the predetermined distance. Consequently, the counting module 925 increments the counter by one. Finally, the condition determination module 923 determines, based on the number of satisfying verifying locations tracked in the counter, whether a predefined condition is satisfied (e.g., whether the number of satisfying verifying locations is greater than a predetermined threshold).

Figure 10:
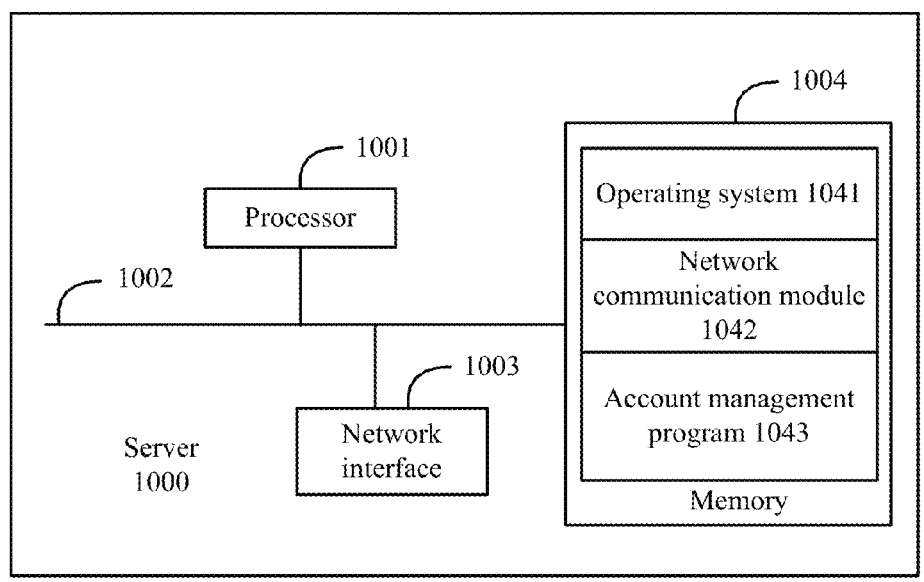
FIG. 10 is a block diagram of a server in accordance with some embodiments.

FIG. 10 is a block diagram of a server 1000 in accordance with some embodiments. The server 1000 can be structurally and functionally similar to the servers and/or account management apparatus shown and described above with respect to FIGS. 1-9. The server 1000 can be operatively coupled to (e.g., via a wireless connection) and communicate with one or more mobile devices (e.g., the mobile device 320 in FIG. 3) to provide an account management service to user(s) of the mobile device(s). As shown in FIG. 10, the server 1000 includes a processor 1001, a communication bus 1002, a network interface 1003 and a memory 1004 including an operating system 1041, a network communication module 1042 and an account management program 1043. In some embodiments, the server 1000 can include more devices, components and/or modules than those shown in FIG. 10.

The processor 1001 can be any processing device capable of performing at least a portion of the account management methods described herein. Such a processor can be, for example, a CPU, a DSP, a FPGA, and/or the like. The processor 1001 can be configured to control the operations of other components and/or modules of the server 1000. For example, the processor 1001 can be configured to control operations of the network interface 1003. For another example, the processor 1001 can be configured to execute instructions or code stored in a software program or module (e.g., the operating system 1041, the network communication module 1042, and the account management program 1043) within the memory 1004.

The communication bus 1002 is configured to implement connections and communication among the other components of the server 1000. The network interface 1003 is configured to provide and control network interfaces of the server 1000 that are used to interact with other network devices (e.g., mobile devices, user terminals). The network interface 1003 can include, for example, a standard wired interface and a standard wireless interface (e.g., a Wi-Fi interface). In some embodiments, the network interface 1003 is used for connecting one or more mobile devices and performing data communication with the one or more mobile devices. In some embodiments, operations of the network interface 1003 are controlled by instructions or code stored in the network communication module 1042 in the memory 1004.

In some embodiments, the memory 1004 can include, for example, a random-access memory (RAM) (e.g., a DRAM, a SRAM, a DDR RAM, etc.), a non-volatile memory such as one or more magnetic disk storage devices, optical disk storage devices, flash memory devices, or other non-volatile solid state storage devices. In some embodiments, the memory 1004 can include one or more storage devices (e.g., a removable memory) remotely located from other components of the server 1000.

In some embodiments, each component, program, application or module (e.g., the operating system 1041, the network communication module 1042, and the account management program 1043) included in the memory 1004 can be a hardware-based module (e.g., a DSP, a FPGA), a software-based module (e.g., a module of computer code executed at a processor, a set of processor-readable instructions executed at a processor), or a combination of hardware and software modules. Instructions or code of each component, program, application or module can be stored in the memory 1004 and executed at the processor 1001. In some embodiments, the memory 1004 can include more or less components, programs, applications or modules than those shown in FIG. 10.

In some embodiments, the server 1000 is configured to perform at least a portion of the account management methods shown and described above with respect to FIGS. 1-9. In such embodiments, for example, the server 1000 communicates with a mobile device (similar to the mobile devices or user terminals shown and described above with respect to FIGS. 1-9) to perform a user authentication process. The account management program 1043, when executed by the processor 1001, is configured to perform at least a portion (the server-side portion) of the account management methods to acquire account identification and verifying location(s), compare verifying location(s) with predefined location(s), and grant or deny user authentication based on the comparison result and a predefined condition as described above in connection with FIGS. 1 and 2.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method, comprising:
   at a computer system having one or more processors and memory for storing programs to be executed by the one or more processors:
      receiving a request associated with an account, the request including location verification information;
      in response to the request, retrieving information of a set of predefined locations associated with the account;
      comparing information of the set of predefined locations with the received location verification information to determine whether the received location verification information satisfies a predefined condition; and
      in accordance with a determination that the received location verification information satisfies the predefined condition, sending a response to the request to a destination associated with the account, the response including confidential information associated with the account,
      wherein the received location verification information includes information of more than one verifying location and the set of predefined locations includes more than one predefined location associated with the account.

2. The method of claim 1, wherein the received location verification information includes information of a set of verifying locations and the received location verification information satisfies the predefined condition when at least one distance between a verifying location from the set of verifying locations and a predefined location from the set of predefined locations is less than a predetermined distance.

3. The method of claim 1, wherein the received location verification information includes information of a set of verifying locations and the received location verification information satisfies the predefined condition when each verifying location from the set of verifying locations is within a predetermined distance from at least one predefined location from the set of predefined locations.

4. The method of claim 1, wherein the received location verification information includes information of a set of verifying locations and the received location verification information satisfies the predefined condition when a number of verifying locations from a group of verifying locations is greater than a predetermined threshold, each verifying location from the group of verifying locations is (1) from the set of verifying locations, and (2) within a predetermined distance from at least one predefined location from the set of predefined locations.

5. The method of claim 1, wherein the received location verification information includes at least one of location information defined by a user of a mobile device or location information generated by a Global Positioning System (GPS) of a mobile device.

6. The method of claim 1, wherein the request is a verification request associated with the account, the method further comprising:
   receiving, prior to receiving the verification request, a register request including information of a set of registering locations associated with the account; and
   setting, based on the register request, the set of registering locations to be the set of predefined locations associated with the account.

7. The method of claim 1, further comprising:
   when the received location verification information fails to satisfy the predefined condition, sending an error message indicating the failure of the received location verification information.

8. A mobile device, comprising:
   one or more processors; and
   memory storing one or more programs to be executed by the one or more processors, the one or more programs comprising instructions for:
      defining a verification request associated with an account, the verification request including location verification information;
      sending the verification request to a server device such that the location verification information is compared with information of a set of predefined locations associated with the account to determine whether the location verification information satisfies a predefined condition; and
      in accordance with a determination that the location verification information satisfies the predefined condition, receiving a response to the verification request from the server device, the response including confidential information associated with the account,
      wherein the location verification information includes information of more than one verifying location and the set of predefined locations includes more than one predefined location associated with the account.

9. The mobile device of claim 8, wherein defining the verification request includes at least one of entering the location verification information by a user of the mobile device or generating the location verification information by a Global Positioning System (GPS) of the mobile device.

10. The mobile device of claim 8, wherein the one or more programs further include instructions for:
    sending, to the server device, a register request including information of a set of registering locations associated with the account such that the set of registering locations is set as the set of predefined locations associated with the account at the server device.

11. The mobile device of claim 8, wherein the one or more programs further include instructions for:
    when the location verification information fails to satisfy the predefined condition, receiving an error message indicating the failure of the location verification information.

12. A non-transitory computer readable storage medium storing one or more programs in connection with a computer system, the one or more programs comprising instructions, which, when executed by one or more processors of the computer system, cause the processors to perform operations comprising:
- receiving a verification request associated with an account, the verification request including a set of verifying locations;
- in response to the verification request, retrieving information of a set of predefined locations associated with the account;
- comparing information of each verifying location from the set of verifying locations with information of the set of predefined locations to determine whether each verifying location from the set of verifying locations satisfies a predefined condition;
- determining whether a number of verifying locations from the set of verifying locations that satisfy the predefined condition is greater than a predetermined threshold; and
- in accordance with a determination that the number of verifying locations from the set of verifying locations that satisfy the predefined condition is greater than the predetermined threshold, sending a response to the verification request to a destination associated with the account, the response including confidential information associated with the account.

13. The non-transitory computer readable storage medium of claim 12, wherein the one or more programs include instructions for:
- determining whether a number of received verifying locations that satisfy the predefined condition is greater than the predetermined threshold; and
- when the number of received verifying locations that satisfy the predefined condition is greater than the predetermined threshold, suspending receiving information of any new verifying location.

14. The non-transitory computer readable storage medium of claim 12, wherein the one or more programs include instructions for:
- determining whether a number of received verifying locations that satisfy the predefined condition is greater than the predetermined threshold; and
- when the number of received verifying locations that satisfy the predefined condition is not greater than the predetermined threshold and a total number of received verifying locations is less than a predetermined maximum number of verifying locations, sending a signal to prompt information of next verifying location.

15. The non-transitory computer readable storage medium of claim 12, wherein the one or more programs include instructions for:
- determining whether a number of received verifying locations that satisfy the predefined condition is greater than the predetermined threshold; and
- when the number of received verifying locations that satisfy the predefined condition is not greater than the predetermined threshold and a total number of received verifying locations is equal to a predetermined maximum number of verifying locations, sending an error message indicating the failure of the verification request.

16. The non-transitory computer readable storage medium of claim 12, wherein the one or more programs include instructions for:
- receiving, prior to receiving the verification request, a register request including information of a set of registering locations associated with the account; and
- setting, based on the register request, the set of registering locations to be the set of predefined locations associated with the account.

17. The non-transitory computer readable storage medium of claim 12, wherein a verifying location satisfies the predefined condition when at least one distance between that verifying location and a predefined location from the set of predefined locations is less than a predetermined distance.

18. The non-transitory computer readable storage medium of claim 12, wherein the set of predefined locations includes more than one predefined location.

* * * * *